Oct. 5, 1937.  O. R. SCHOENROCK  2,094,850
APPARATUS FOR AND METHOD OF MAKING VALVE SPRING RETAINER LOCKS
Filed May 31, 1935  4 Sheets-Sheet 1
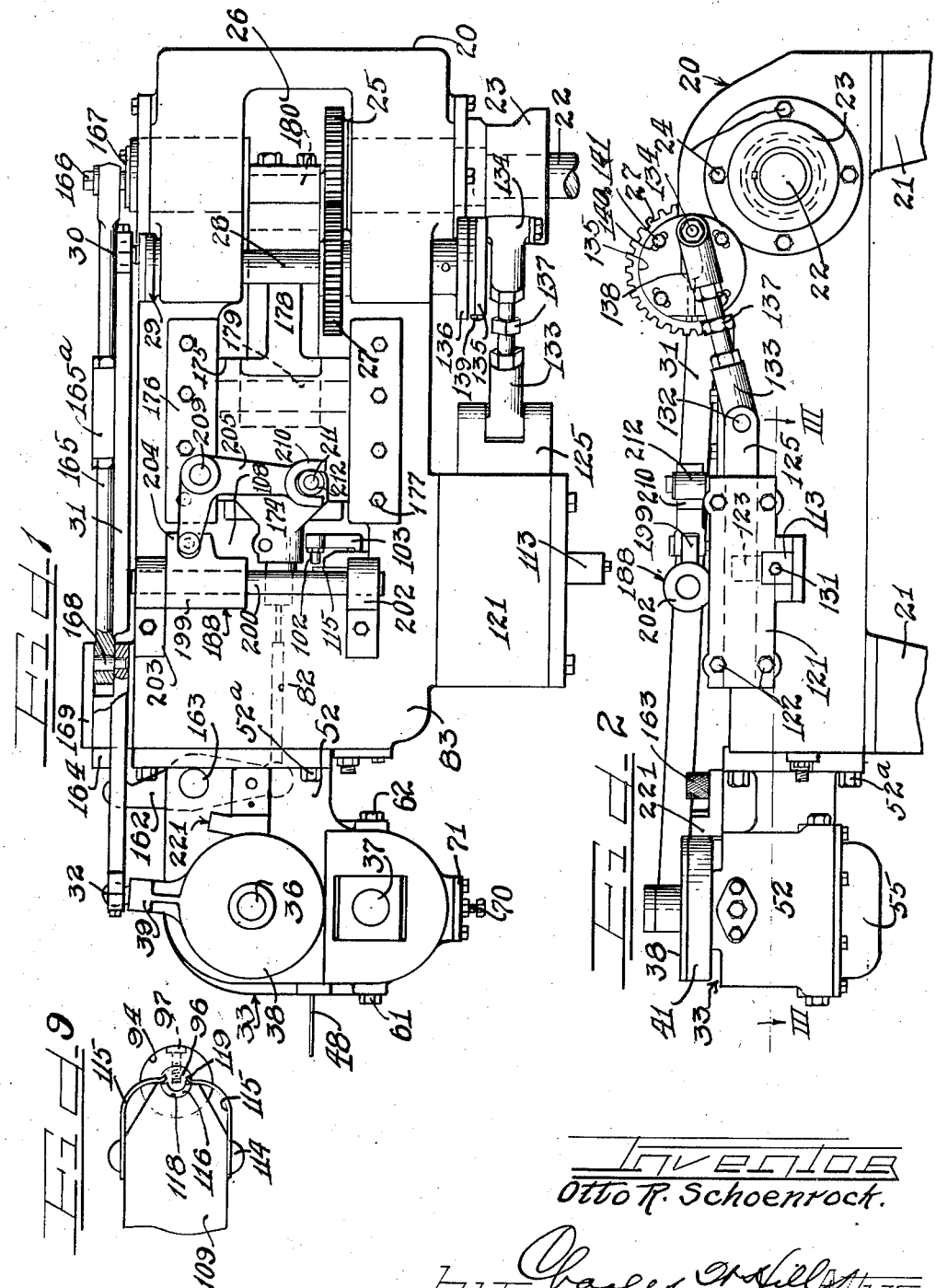

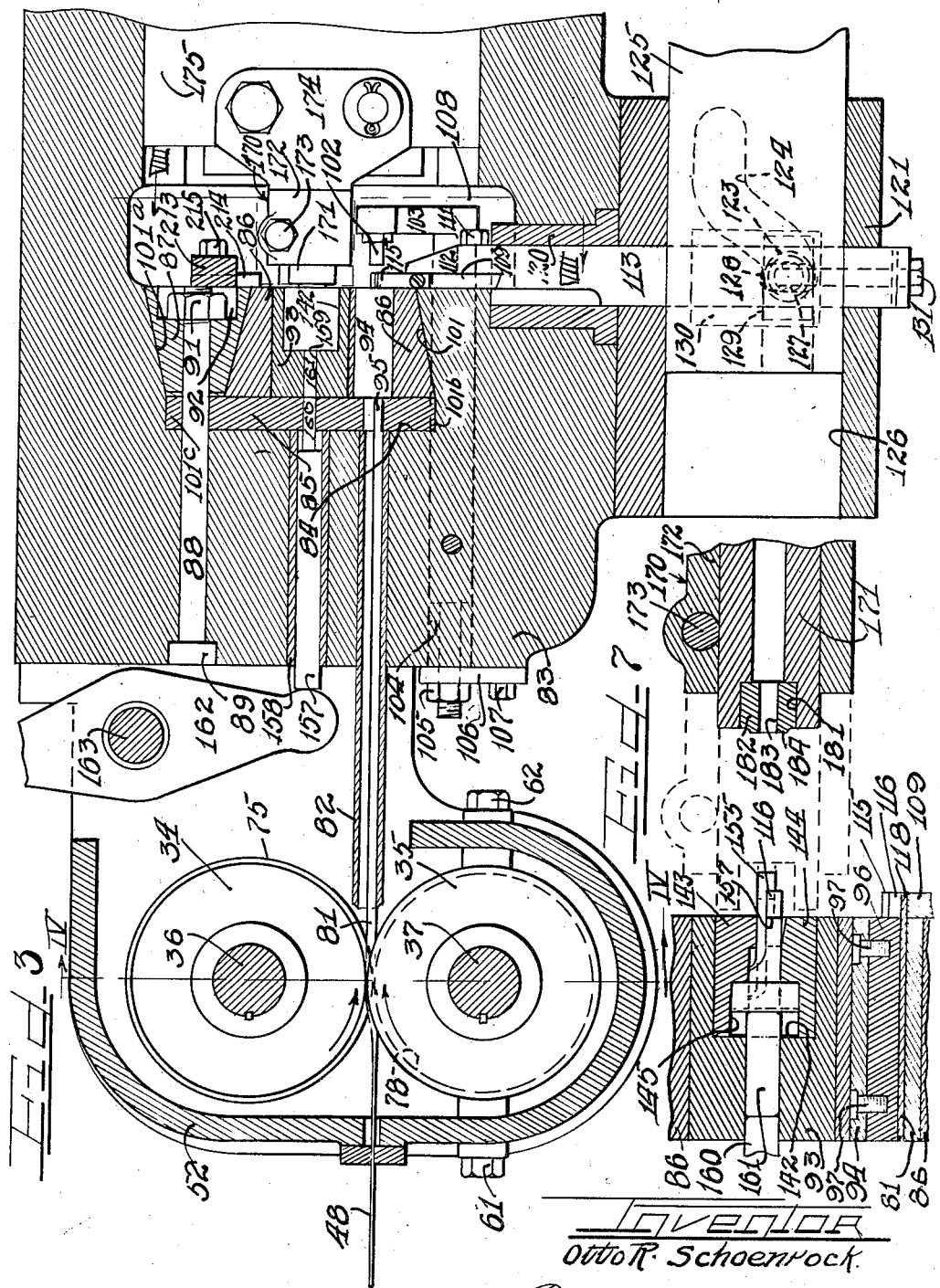

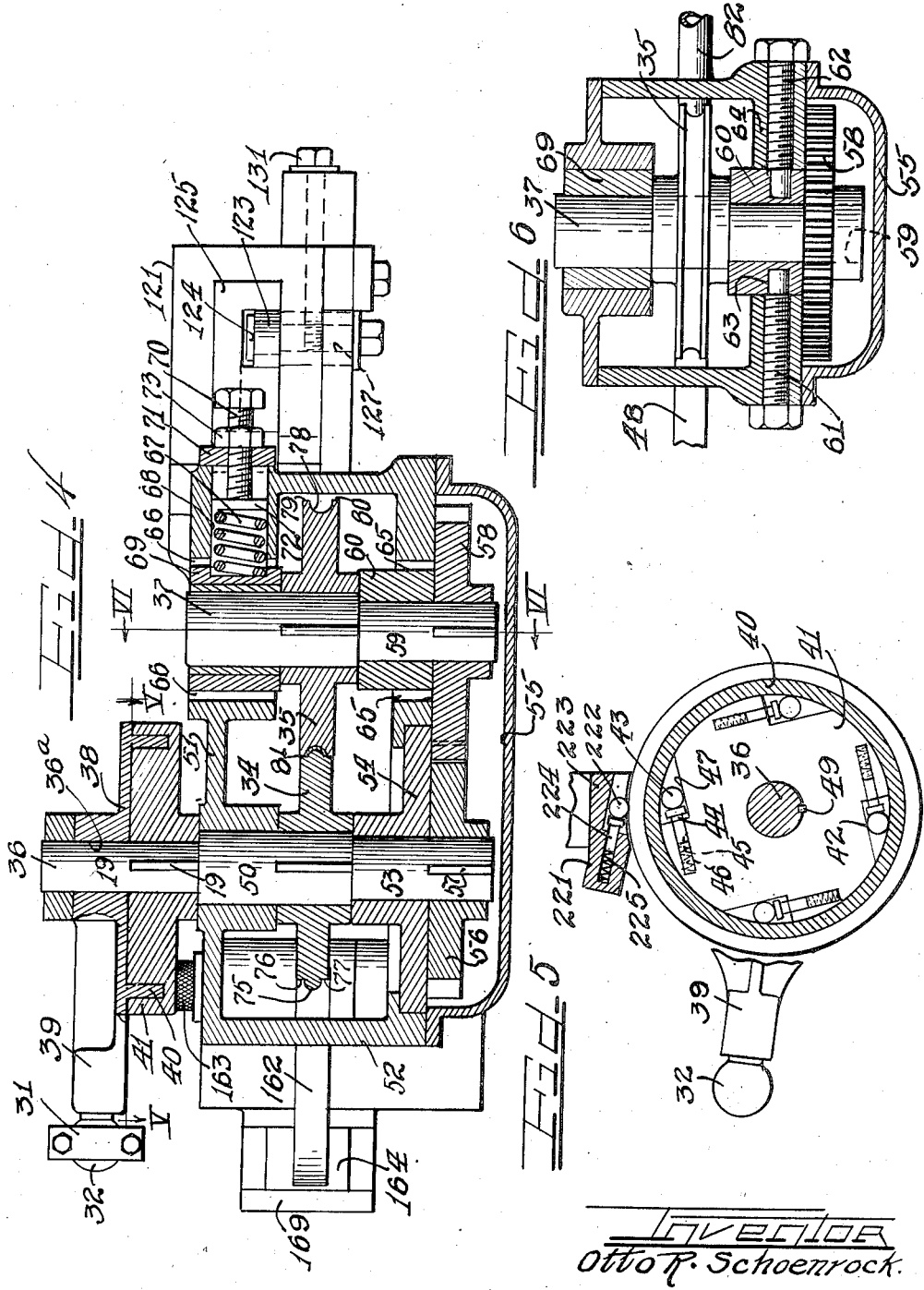

Oct. 5, 1937.  O. R. SCHOENROCK  2,094,850
APPARATUS FOR AND METHOD OF MAKING VALVE SPRING RETAINER LOCKS
Filed May 31, 1935    4 Sheets-Sheet 4
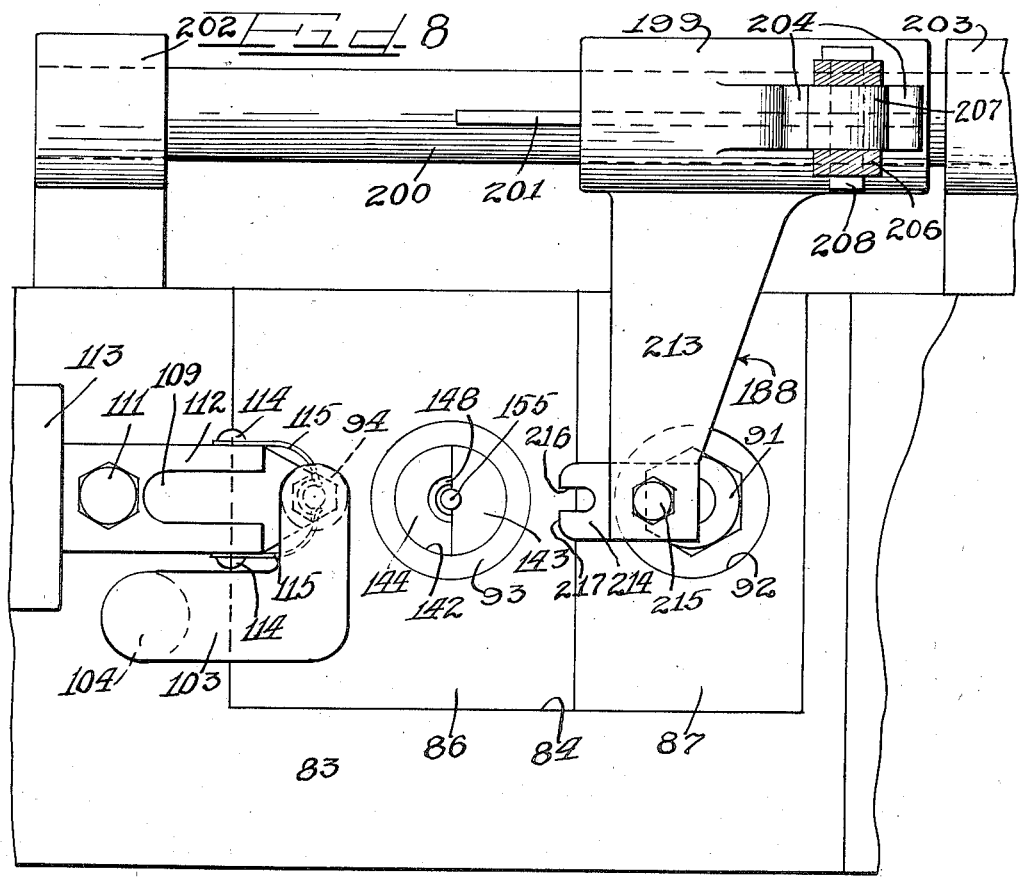
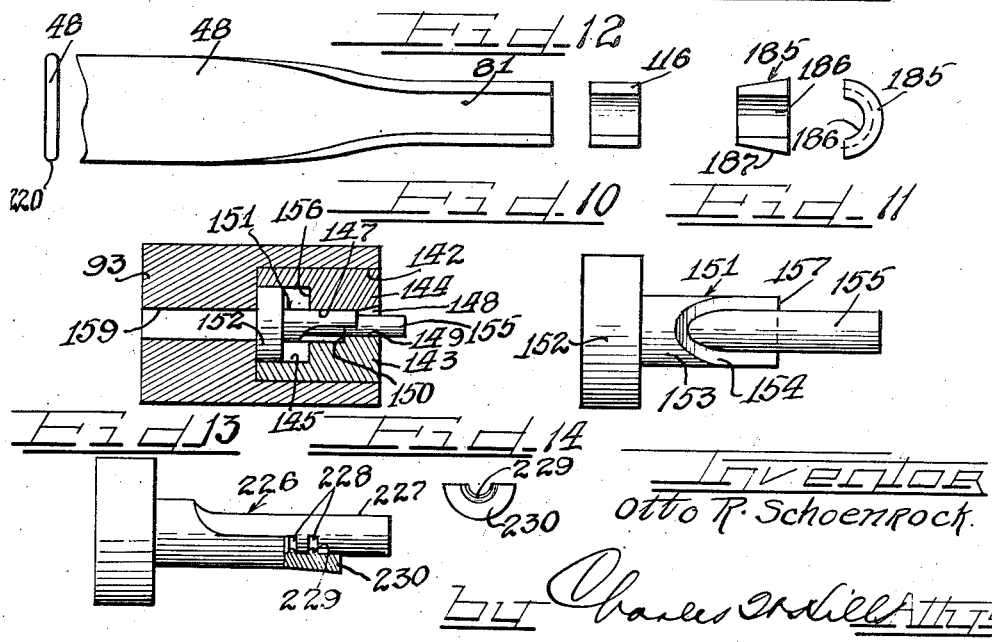
Inventor
Otto R. Schoenrock Patented Oct. 5, 1937

2,094,850

UNITED STATES PATENT OFFICE 2,094,850

APPARATUS FOR AND METHOD OF MAKING VALVE SPRING RETAINER LOCKS

Otto R. Schoenrock, Chicago, Ill., assignor to Thompson Products, Incorporated, Cleveland, Ohio, a corporation of Ohio Application May 31, 1935, Serial No. 24,352

27 Claims. (Cl. 29—34)

This invention relates to apparatus for and a method of making valve spring retainer locks.

Such locks have been previously made from strip metal by a series of die stamping, trimming and severing operations. My present method also starts with strip metal but employs different steps and involves no trimming operations.

According to my invention, rolled strip stock is passed through a pair of feed and forming rolls to bend the strip into segmental cylindrical form. The thus formed strip of metal is then severed to form blanks of the same length as the finished locks, or substantially so. These blanks are next subjected to a die forming operation in which they are upset to form the collars that constitute the valve spring retainer locks. From segmental cylindrical form, the blanks are upset to provide a segmental frusto-conical outer wall, leaving the inner wall segmental cylindrical.

If desired, beads may be formed on the inner surface during the upsetting operation. The beads serve, as is well known, to position the collars about the grooved stem of the valve, while the frusto-conical outer walls function to wedgingly engage with and lock the valve spring retainer plate or flange in place.

It is therefore an object of this invention to provide an apparatus for and a method of making valve spring retainer locks in a relatively simple and economical manner and with no loss of metal from trimming operations.

It is a further object of this invention to provide in a single apparatus the necessary mechanisms properly synchronized, to form, sever and upset metal blanks from rolled strip stock to make valve spring retainer locks.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of a machine embodying the principles of my invention.

Figure 2 is a side elevational view of the same.

Figure 3 is an enlarged fragmentary sectional view taken substantially on the line III—III of Fig. 2, with parts in elevation.

Figure 4 is a sectional view taken substantially on the line IV—IV of Fig. 3, with parts in elevation.

Figure 5 is a sectional view taken substantially on the line V—V of Fig. 4, with parts in elevation.

Figure 6 is a sectional view taken substantially on the line VI—VI of Fig. 4, with parts in elevation.

Figure 7 is an enlarged fragmentary sectional view of the die forming mechanism, with parts in elevation and with parts dotted in to show the operation.

Figure 8 is a sectional view taken substantially on the line VIII—VIII of Fig. 3.

Figure 9 is an enlarged detail view of the cutting mechanism.

Figure 10 is an enlarged detail sectional view of one of the die blocks.

Figure 11 is an enlarged detail elevational view of the plunger or post associated with the die block of Fig. 10.

Figure 12 is a series of views in section and in elevation of the strip material and the blank and collar formed therefrom.

Figure 13 is a detail elevational view of a modified form of plunger or post for forming a valve spring retainer lock with cooperating beads to position the locks on the grooved stems of valves.

Figure 14 is an end elevational view of a collar formed with beads on the mechanism of Fig. 13.

As shown on the drawings:

As shown in Figs. 1 and 2, the reference numeral 20 indicates generally the frame structure of a machine for making valve spring retainer locks embodying the principles of my invention. Said frame 20 may be supported upon suitable supports or legs 21. A main driving shaft 22 is mounted in the frame 20 transversely thereof and projects through a bearing box 23 bolted, as by means of bolts 24 to the side of the frame. Said shaft 22 is adapted to be driven from any suitable source of power (not shown).

The shaft 22 carries a gear 25, which is keyed thereon and is positioned within a cut away portion 26 of said frame 20. Said gear 25 meshes with a second gear 27 mounted upon a countershaft 28 which is also journaled in the frame 20. At the rear of the frame, the shaft 28 is provided with a disk 29 carrying an eccentric pin 30. An eccentric arm 31 is connected to said pin 30 and also to a pin 32 forming a part of the feed and forming roll mechanism, indicated generally by the reference numeral 33.

Said feed and forming mechanism 33 comprises (Figs. 3 to 6 inclusive) a pair of rolls 34 and 35 mounted upon shafts 36 and 37, respectively, to lie in the same horizontal plane. The shaft 36 is provided with a reduced cylindrical end portion 36a on which is loosely mounted a clutch member 38, from which extends a boss 39 carrying the headed pin 32. Said clutch member 38 is provided with an inwardly extending annular flange 40 that projects into a recessed plate 41 constituting the other cooperating clutch member.

The construction of the clutch comprising the members 38 and 41 is best shown in Fig. 5, wherein the plate 41 is shown as provided with angularly shaped peripheral recesses 42, of which there may suitably be four in number. In each one of said recesses 42 is positioned a ball or roller 43, against which normally bears a spring pressed plunger 44. Each plunger 44 extends into a recess 45, provided for the purpose, in the bottom of which is positioned a spring 46. The tendency of each spring 46 is to force the corresponding plunger 44 constantly against the cooperating ball or roller 43 to urge the same into wedging engagement between the inner cylindrical wall of the flange 40 and a plane wall 47 of the recess 42.

By this arrangement of clutch elements, the oscillating movement imparted to the clutch member 38 through the eccentric pin 30, eccentric arm 31 and headed pin 32, is translated into intermittent movement of the clutch member 41 in one direction only. This direction, as will be later pointed out, is the direction necessary to cause the feeding of strip material, indicated at 48, between the cooperating feed and forming rollers 34 and 35. It will be noted that the clutch member 41 is secured to the reduced end 36a of the shaft 36 by means of a key 49.

Said shaft 36 is provided with an enlarged intermediate cylindrical portion 50 that is journaled in one side 51 of a casing 52 suitably supported, as by bolts 52a (Fig. 1), from the main frame 20. The other end of the shaft 36 is also reduced as at 53 and is journaled in a plate 54 secured in the casing 52. A cover plate 55 closes the lower side of the casing 52.

A gear 56, fixed upon the reduced end 53 of the shaft 36 by means of a key 57, meshes with another gear 58 keyed upon the reduced end 59 of the shaft 37. Said reduced end 59 is mounted in a tiltable bearing 60, tilting action being provided by a pair of opposed studs 61 and 62 (Fig. 6) that extend into recesses 63 and 64 formed in said bearing 60. The bearing 60 is thus tiltable about the cylindrical ends of the studs 61 and 62. Clearances 65 (Fig. 4) are provided between the outer wall of the bearing 60 and the wall of the casing 52 at portions intermediate the positions of the studs 61 and 62.

The purpose of the tilting movement just described is to permit forming pressure to be exerted by the feed and forming roll 35 against its cooperating roll 34. Such pressure is supplied by means of a coiled spring 67 (Fig. 4) positioned within a recess 68 in the casing 52 and adapted to exert a compressive force against a bearing 69 for the other end of the shaft 37. Said bearing 69 is provided with clearances 66 to permit its movement in the direction of the force of the spring 67. The amount of this compressive force may be controlled by means of a screw 70 threaded through a plate 71 secured to said casing 52. Said screw 70 carries at its inner end a movable head 72 that bears against the spring 67. A lock nut 73 holds the screw 70 in its adjusted position. The forming pressure between the rolls 35 and 34 is thus controlled by adjustment of the screw 70.

Since the forming roll 35 is secured upon the shaft 37, as by means of a key 74, said forming roll 35 is caused to rotate at the same peripheral speed as the forming roll 34 by reason of the train of gears 56 and 58.

The forming roll 34 is provided with a convex peripheral surface 75 which is substantially semicircular in cross section (Fig. 4) and which is bounded on each side with cylindrical surfaces 76 and 77. The forming roll 35 is complementarily formed with a concave peripheral surface 78 and adjoining cylindrical surfaces 79 and 80. The roll 34 thus constitutes the male, and the roll 35 the female forming element.

As the metal strip 48 passes between said rolls 34 and 35, it is bent into segmental cylindrical form, as indicated at 81. A cylindrical tube 82 (Fig. 3) serves to guide the segmental cylindrical strip 81 after leaving the forming rolls 34 and 35 into the position at which it is severed into blanks. The tube 82 extends into a casting 83 forming an integral part of the frame 20 and terminates at the bottom of a recess 84 provided in such casting.

Said recess 84 is rectangular in shape as viewed from the front (Fig. 8) but has sloping end walls 101 and 101a (Fig. 3) terminating in parallel straight walls 101b and 101c at the bottom of the recess. A die backing block 85 is positioned in the bottom of said recess 84. Against said backing block is positioned a die holder 86, which is held in place in said recess by a wedge-shaped block 87 (Figs. 3 and 8). A bolt 88 extends through said wedge 87 and backing plate 85 and one end is held in a countersunk recess 89 in the casting 83. The other end of said bolt 88 is threaded to receive a nut 91, adapted to lie in a recess 92 in the face of said wedge 87. By screwing up the nut 91 the assembled elements may be wedgingly held in the recess 84.

The die holder 86 is provided with one cylindrical opening into which fits a heading die holder 93 and with a second cylindrical opening in which is positioned a cut-off die holder 94 (Figs. 3, 7 and 8). Said cut-off die holder 94 is aligned with an opening 95 in the backing block 85 forming a continuation of the bore of the tube 82.

A cut-off die 96 (Fig. 7) is held within said holder 94 by means of screws 97 threaded thereinto.

Said cut-off die 96 (Figs. 7 and 9) comprises a member having a segmental cylindrical surface in alignment with the correspondingly curved surface of the opening 95 in the plate 85. The segmental cylindrical strip 81 passes through the aperture 95 and between the segmental cylindrical wall of the cut-off die 96 and a complementarily formed wall of the holder 94. As the segmental cylindrical strip 81 passes between the wall of the holder 94 and the cut-off die 96, it is snugly held against lateral movement, although free to move in the direction of its length. A stop 102 (Figs. 1 and 3) serves to limit the lengthwise movement of the strip 81.

Said stop 102 is carried on the offset arm 103 of a bar 104 which extends through the casting 83. The outer end of said bar 104 is threaded to receive a nut 105 which may be threaded up against a plate 106. The plate 106 is bolted to the casting 83 by means of a bolt 107. The offset end 103 of said bar 104 extends into a recess 108 formed in the casting 83 and serves to position the stop member 102 in alignment with the strip 81 as it projects beyond the end of the cut-off die 96.

While the end of the segmental cylindrical strip 81 is so positioned against the end of the stop 102, a cut-off knife, indicated generally by the reference numeral 109 (Figs. 3, 7, 8 and 9) is moved to sever said projected end. Said cut-off knife 109 is secured by means of a bolt 111 in the recessed end 112 of the reciprocally mounted bar 113. A pair of screws 114 secure a pair of arcuately shaped spring fingers 115, which extend sufficiently beyond the cutting edge of the knife 109 to hold a severed blank 116 thereagainst while the blank is being moved to the heading die holder 93.

As best shown in Fig. 9, the cutting edge 118 of the cut-off knife 109 is semi-circular in outline to conform with the curvature of the blank 116. The ends of the spring fingers 115 are slightly flared outwardly, as at 119, and are so spaced from the cutting edge 118 of the knife 109 as to lightly engage the end edges of the blank 116 to hold said blank against said cutting edge during further movement of the cut-off knife.

Movement of the bar 113 carrying the cut-off knife 109 is effected by mechanism that will now be described. Said bar 113 extends through a bushing 120 positioned in the casting 83 and also through a guide block 121 secured to said casting 83, as by means of bolts 122 (Fig. 2). The bar 113, which is square or rectangular in cross section, carries on its upper face a roller 123 (Figs. 2 and 3) which projects into a cam slot 124 formed in a plunger 125 that moves within the guide block 121 in the guideway 126. Said roller 123 is carried by a pin 127 that extends through an elongated slot 128 in the bar 113 and through a plate 129 mounted on the top face of the bar 113. Said plate 129 is movable within a recessed guideway 130 formed in the bottom of the guideway 126. A bolt 131 extends axially through said bar 113 and threads into the pin 127, thereby providing for adjustment of said pin 127 in the elongated slot 128 lengthwise of the bar 113.

The plunger 125 (Figs. 1 and 2) is pivotally connected as at 132 to an eccentric arm 133, which in turn is connected to an eccentric pin 134 carried by a disk 135 secured to a face plate 136 on the shaft 28. As the shaft 28 revolves, by virtue of the gears 27 and 25 connecting it to the driving shaft 22, the eccentric pin 134 and eccentric arm 133 impart a reciprocating movement to the plunger 125. The limits of the throw of the plunger 125 may be adjusted without changing the length of its stroke by means of a threaded adjusting member 137 forming a part of the eccentric arm 133. Adjustment of the stroke is permitted by varying the eccentricity of the eccentric pin 134. Said pin extends through an elongated slot 138 in said plate 135 and is adjustable therein by means of a bolt 139. The plate 135 is further adjustable with respect to the face plate 136 by virtue of the elongated slots 140 and bolts 141 extending therethrough.

It will be obvious that as the plunger 125 moves forward (toward the left as viewed in Figs. 1 to 3), the roller 123 is caused to follow the cam slot 124 and advance the bar 113 carrying the cut-off knife 109 to severing position. As the plunger 125 moves in the opposite direction, the cam slot 124 in conjunction with the roller 123 retracts the knife 109 to bring it into position for another operation.

Describing now the die forming mechanism, the die holder 93 positioned within the block 86 is provided with a cylindrical recess 142, in which are mounted the lock forming die and blank side of the upsetting die, comprising (Figs. 7, 8 and 10) a pair of semi-cylindrical members 143 and 144. Said members 143 and 144 are provided with enlarged, complementary semi-cylindrical recesses forming a recess 145 in their rear faces and with axially formed recesses providing a cylindrical bore 147. The end portion of said bore 147 provided by the die 144 is outwardly flared toward the working face of said die 144 to provide a segmental frusto-conical recess 148 for receiving a lock blank 116 to be upset. The die block 143 is provided with a restricted segmental cylindrical groove or recess 149, at the junction of which and the cylindrical bore 147 there is formed a shoulder 150.

As best shown in Figs. 10 and 11, a die core, indicated generally by the reference numeral 151, is positioned within the recess 145 with its end extending through the bore 147. Said die core is provided with a cylindrical head 152 that is movable within the cylindrical recess 145. Said die core 151 includes an enlarged cylindrical post 153 having an arcuate cut away portion 154 from which extends a coaxial post 155 of reduced diameter. The diameter of the enlarged portion 153 is substantially that of the cylindrical bore portion 147, while the diameter of the post 155 is substantially that of the segmental cylindrical bore 149. The enlarged portion 153 is so proportioned that when the headed end 152 abuts against the end wall 156 of the recess 145, the shoulder 157, formed between the reduced diameter post 155 and said enlarged portion 153, forms the bottom of the frusto-conical recess 148. The cut away portion 154 permits the forward movement of the die core 151, since it provides clearance between said enlarged portion 153 and the shoulder 150, so that the head 152 can be moved forward until it abuts the forward wall 156 of the recess 145.

The mechanism for so moving the die core 151 will now be described. This mechanism includes a knock-out rod 157 that is slidable in a guide 158 (Fig. 3) extending through the casting 83 and in alignment with a cylindrical bore 159 provided in the backing block 85 and die holder 93. The rod 157 has an end 160 of reduced diameter and of the same diameter as the cylindrical bore 159. A knock-out pin 161 is positioned ahead of the reduced end 160 in the bore 159.

Movement of the knock-out rod 157 is effected by means of a knock-out lever 162 carried by a vertical pin 163 (Figs. 1 and 3). The other end of the knock-out lever 162 extends into the path of a plunger 164 forming part of an eccentric arm 165. Said eccentric arm 165 is connected to an eccentric pin 166 carried by a disk 167 bolted to the end of the drive shaft 22. The eccentric arm 165 is connected at its other end to the plunger 164 by means of a pin 168. The plunger 164 is mounted for reciprocal movement in the knock-out slide 169. The length of travel of said plunger 164 may be adjusted by means of a threaded intermediate portion 165a in the eccentric arm 165, whereby said arm may be shortened or lengthened.

It will thus be apparent that as the drive shaft 22 is revolved, the plunger 164 will be moved into contact with one end of the knock-out lever 162, causing said lever to rock upon the shaft 163 to bring the other end of said lever into contact with the knock-out rod 157, as shown in Fig. 3. Further movement of said knock-out lever 162 causes the knock-out rod 157 to be advanced into the position shown in full lines in Fig. 7, wherein the knock-out pin 161 has moved the die core 151 into position for receiving a semi-cylindrical blank 116, preparatory to the upsetting or heading operation. Said semi-cylindrical blank 116 fits snugly about the reduced end 155 of the die core and up against the shoulder 157.

While in this position, a heading die, indicated generally by the reference numeral 170 (Figs. 3 and 7) is moved from its retracted position to the position shown in dotted lines in Fig. 7. Said heading die comprises a punch holder 171 positioned within a bracket 172 and secured therein by means of a pin 173. The bracket 172 is in turn secured to or formed integral with an adjusting block 174 carried by a cross-head 175.

Said cross-head 175 is slidably mounted in a pair of guides 176 (Fig. 1) secured by means of bolts 177 to the top of the frame 20. A pitman 178 is pivotally connected to said cross-head 175 by means of a pin 179 and at its other end is connected to a crank arm 180 formed on the driving shaft 22. Rotation of the driving shaft 22 thus effects a reciprocal movement of the cross-head 175 within the guideways 176 to advance and retract the die punch holder mechanism 170.

The die punch holder 171 is recessed at its end, as at 181, to receive a punch 182. Said punch 182 is provided with an axially extending bore 183 of the same diameter as the diameter of the reduced end 155 of the die core 151. The face 184 of said punch 182 forms an annular projection having an outside diameter substantially that of the frusto-conical recess 148 in the die element 144. The working face 184, when the punch holder is advanced, first engages the end of the semi-cylindrical blank 116 and then upon continued forward movement, forces the die core back into the recess 145 until the rear face of the die core is in abutment against the wall of the die holder 93 at the bottom of the recess 142. Further forward movement of the punch causes the semi-cylindrical blank 116 to be upset against the shoulder 157 of the die core to fill the segmental frusto-conical recess 148. The amount of metal in the blank 116 is just sufficient to fill said recess 148 when the blank is upset to form a valve spring retainer lock, thus eliminating any fin or waste of metal. The resulting finished collar or valve spring retainer lock, indicated by the reference numeral 185 (Fig. 12) has a substantially half cylindrical inner wall 186 and a frusto-conical outer wall 187, the length of the finished collar or lock being substantially the same as the length of the segmental cylindrical blank 116.

After the upsetting of the segmental cylindrical blank 116 has been completed and the punch has been withdrawn, the knock-out lever 162 again operates to advance the knock-out rod 157 and pin 161 to advance the die core 151 into position to discharge the finished collar 185. In order to insure the finished collar being freed from the post 155 of the die core, a stripping mechanism, indicated generally by the reference numeral 188 is provided (Figs. 1, 2 and 8). Said stripping device includes a sleeve 199 slidably mounted upon a shaft 200 and held against rotating thereon by means of a key 201. Said shaft is supported at its ends in brackets 202 and 203 bolted to the casting 83 of the framework. Said sleeve 199 is provided with a pair of spaced ears 204, between which extends an end of a bell crank 205. Said bell crank end is bifurcated as at 206 (Fig. 8) and between said bifurcated end 206 is mounted a roller 207 upon a pin 208.

The bell crank 205 is pivoted as at 209 about a pin secured to one of the guideways 176. The other end of the bell crank 205 is U-shaped, as at 210, to encompass a pin 211 carrying a roller 212 mounted on said pin from the gate or cross-head 175. Movement of the cross head 175 is thus translated through the bell crank 205 to cause a reciprocating movement of the sleeve 199 on the cross shaft 200.

Said sleeve 199 has an integrally formed downwardly extending arm 213 (Fig. 8) which moves along the vertical face of the casting 83. Said arm 213 carries at its end a stripper 214, secured thereto by means of a bolt 215. Said stripper is provided at its end with a U-shaped recess 216 of a width substantially equal to the diameter of the die core post 155 and in alignment therewith, so that when the stripper 214 advances, the die core post 155 will be received by said recess 216 and the bifurcated end 217 of said stripper will engage with the end edges of the die formed collar 185 and disengage the same from said post 155. After being freed from said post 155, the finished collar may drop into any suitable receptacle therefor.

The operation of the machine will now be described.

The rolled strip stock 48 which is fed in between the feed and forming rollers 34 and 35 is of an analysis suitable for use in the manufacture of valve spring retainer locks. Preferably the strip material 48 is obtained in a form having slightly rounded edges 220 (Fig. 12), although that is not essential.

The feeding of the strip stock 48 between the feed rolls 34 and 35 is intermittent, as already explained, through the action of the eccentric pin 30, eccentric rod 31 and clutch member 38. The action of the spring pressed rollers or balls 43 is to cause rotation of the inner clutch member 41 in one direction only. In order to insure against a reverse movement of said clutch member 41, a braking device, indicated generally at 221 (Figs. 1, 2 and 5) is provided, comprising a spring pressed roller or ball 222 mounted in a holder 223 and held against the outer periphery of the clutch member 41 by means of a plunger 224 and a spring 225.

Because of the gear connections 56—58 between the shafts 36 and 37 of the feed rolls 34 and 35, respectively, said feed and forming rolls are driven together at the same speed and with the adjacent points of their peripheries moving in the same direction. As the strip material 48 passes between said rolls 34 and 35, the lateral edges of the strip material are bent upwardly to conform with the curvature of the roll peripheries 75 and 78, thereby converting the strip into a segmental cylindrical strip 81. The forming pressure is controlled, as already explained, by means of the adjusting screw 70 that regulates the amount of spring pressure applied to the bearing 69 of the pivotally mounted shaft 37.

After passing beyond the forming rolls 34 and 35, the segmental cylindrical strip 81 enters the guiding tube 82 and is moved forwardly until its end abuts the stop 102. It will be understood of course, that the movement of the various mechanisms are so synchronized and so adjusted that the forward movement, during any intermittent feed of the strip material 48 as caused by rotation of the feed rolls 34 and 35, will stop just at or about the time that the end of the strip 81 comes into abutment against the stop 102. Preferably the feed of the rolls 34 and 35 is slightly more than necessary to advance the strip 81 the desired length of a blank, but slippage between the strip and the rolls occurs to compensate for this after the end of the strip hits the stop 102.

When the strip 81 is in position against the abutment 102, and while the feed rolls 34 and 35 are at rest, the cut-off knife 109 is advanced to sever a blank 116 from said strip end. As above described, the movement of the cut-off knife 109 is brought about by the movement of the plunger 125 in the guideway 126 by virtue of the cam slot 124 in which the roller 123 secured to the cut-off knife bar 113 travels. The timing of the movement of the cut-off knife 109 can be adjusted to synchronize with the intermittent feed of the rolls 34 and 35 by adjusting the position of the disk 135 with respect to the face plate 136 on the shaft 28, and also by adjusting the position of the eccentric pin 134 in the elongated slot 138 and by adjusting the length of the eccentric arm 133 by the threaded intermediate member 137.

As the cutting edge 118 of the cut-off knife 109 is moved into contact with the end of the strip 81 to sever a blank 116 therefrom, the spring fingers 115 engage over the end edges of said blank 116 to hold the severed blank in place during the continued forward movement of the cut-off knife 109. At the forward limit of its stroke, the cut-off knife 109 brings the severed blank 116 into engagement with the die core post 155.

At the time the cut-off knife moves the blank 116 into position in engagement with the post 155 of the die core, with said die core in its forward position (Fig. 7) the punch mechanism 170 also moves forward to cause the face 184 of the punch to engage the end of the blank 116. While the punch holds the blank against the shoulder 157, the cut-off knife is withdrawn, the spring fingers 115 releasing the blank. The continued forward throw of the pitman 178 immediately thereafter moves the cross head 175 to bring the punch 170 into the position shown in dotted lines in Fig. 7. The working face 184 of the punch 182 presses against the end edge of the blank 116 and forces the die core into position at the bottom of the recess 145. Further movement of the punch effects the upsetting or heading operation to convert the blank 116 into the form of the finished collar 185. There should be just a slight clearance between the edge of the frusto-conical recess 148 and the outer edge of the punch face 184 to permit any slight excess of metal in the recess to flow out. It is not necessary, however, to trim or machine the formed collar since such excess of metal would be along the outside edge of the collar and therefore not objectionable.

After the blank has been upset and the punch 170 retracted, the knock-out rod 157 is operated by the knock-out lever 162 to force the die core into its projected position. As the die core 151 is moved outwardly, the shoulder 157 brings the formed collar out of the frusto-conical recess 148 into the discharge position. The stripper mechanism 188 thereupon operates to knock the formed collar from the post 155 into a receptacle (not shown). As already explained, movement of the stripping device 188 is accomplished in synchronism with the movement of the cross head 175 through the action of the bell crank 205 and the sleeve 199 carrying the stripper arm 213. The stripper end 217 is brought out of the way as the cross head 175 is retracted.

If it is desired to make a valve spring retainer lock having a beaded inner surface, a form of die core such as that shown in Fig. 13 may be employed. As there shown, a die core 226 is provided with a cylindrical post 227 having one or more segmental grooves 228 formed in its working face and extending transversely thereof. Consequently, when a blank is upset in the manner already described, a portion of the metal of the blank, as indicated at 229, will flow into the groove or grooves 228 to form transverse beads. A finished valve spring retainer lock 230 will thus be produced having a frusto-conical outer surface and a segmental cylindrical inner surface with one or more beads 229 extending transversely along said inner surface.

Although this invention has been described as being particularly applicable to the manufacture of valve spring retainer locks, it will be understood that collars, bearing members and the like of the general shape of the valve spring retainer locks disclosed, or a shape somewhat similar thereto, may be made in a machine of my invention. Other shapes and forms of heading dies and punches may be substituted to obtain specific shapes or forms of the finished article.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of making valve spring retainer locks, which comprises intermittently rolling a continuous flat band of metal into a lengthwise extending segmental cylindrical shape, severing said rolled band into blanks of the length of the finished collar and upsetting said blanks endwise to form collars having frusto-conical outer surfaces and segmental cylindrical inner surfaces.

2. The method of making valve spring retainer locks, which comprises intermittently rolling a continuous flat band of metal into a lengthwise extending segmental cylindrical shape, severing said rolled band into blanks of the length of the finished collar and upsetting said blanks endwise to form collars having frusto-conical outer surfaces and segmental cylindrical inner surfaces while simultaneously forming a transverse bead on said inner surface.

3. In a machine for making valve spring retainer locks, a pair of cooperating grooving rollers, means for urging said rollers together to form a flat metal strip passing therebetween into a segmental cylindrical strip, means for severing said strip to form blanks, a die stamping device for upsetting said blanks to form collars having frusto-conical outer surfaces and segmental cylindrical inner surfaces, driving means associated with said machine, and means for actuating said rollers and said first and second named means and said device by said driving means.

4. In a machine for making valve spring retainer locks, means for forming a flat metal strip into a segmental cylindrical strip, means for severing said strip to form blanks, a die stamping device for upsetting said blanks to form collars having frusto-conical outer surfaces and segmental cylindrical inner surfaces, driving means, and means operative by said driving means for actuating said forming and severing means and said device.

5. In a machine for making valve spring retainer locks, a pair of driven feed rolls having cooperating convex and concave peripheral surfaces, means for urging said surfaces toward each other, means for driving one of said rolls to feed flat strip material therethrough, means for severing said strip material to form blanks, die means for upsetting said blanks, means for liberating said upset blanks from said die means, driving means, and means operative by said driving means for actuating said rolls and said severing means and said die means.

6. In a machine for making valve spring retainer locks, a pair of feed rolls having cooperating convex and concave peripheral surfaces, means for driving one of said feed rolls to feed flat strip material therebetween, means for urging said rolls together to bend said flat strip material into segmental cylindrical shape, means for severing said segmental cylindrical strip material into blanks, means for upsetting said blanks endwise to form collars having frusto-conical outer surfaces and cylindrical inner surfaces, driving means, and connections operative by said driving means for actuating said one roll, said urging means, said severing means and said upsetting means.

7. In a machine for making valve spring retainer locks, a pair of feed rolls having cooperating convex and concave peripheral surfaces, means for driving one of said feed rolls to feed flat strip material therebetween, means for urging said rolls together to bend said flat strip material into segmental cylindrical shape, means for severing said segmental cylindrical strip material into blanks, die means for upsetting said blanks endwise to form collars having frusto-conical outer surfaces and cylindrical inner surfaces, means for liberating said collars from said die means, a driving shaft, and connections between said shaft and said aforesaid means for actuating all of said means in synchronized order.

8. In a machine for making valve spring retainer locks, a pair of feed rolls having cooperating convex and concave peripheral surfaces, means for intermittently driving one of said feed rolls to feed flat strip material therebetween, resilient means for urging said rolls together to bend said flat strip material into segmental cylindrical shape, means for severing said segmental cylindrical strip material into blanks, means for upsetting said blanks endwise to form collars having frusto-conical outer surfaces and cylindrical inner surfaces, a driving shaft, and connections between said shaft and said aforesaid means for actuating the same in synchronized order.

9. In apparatus for making valve spring retainer locks from segmental cylindrical blanks, die mechanism comprising a die having a cylindrical bore therein, said bore having a segmental frusto-conical enlargement at one end, a die core within said bore having a reduced cylindrical end portion forming a shoulder, a punch having a bore for receiving said reduced end portion, and means for moving said punch to upset a blank against said shoulder between the wall of said frusto-conical enlargement and said reduced end.

10. In apparatus for making valve spring retainer locks from segmental cylindrical blanks, a die having a segmental frusto-conical opening, a die core cooperating therewith, and a punch for upsetting a segmental cylindrical blank within said opening to form a lock having a segmental cylindrical inner wall and a frusto-conical outer wall.

11. In apparatus for making valve spring retainer locks from segmental cylindrical blanks, a die having a segmental frusto-conical opening, a die core cooperating therewith having a shoulder and a cylindrical reduced end extending therebeyond, and a punch for upsetting a segmental cylindrical blank within said opening against said shoulder to form a lock having a segmental cylindrical inner wall and a frusto-conical outer wall.

12. In apparatus for making valve spring retainer locks from segmental cylindrical blanks, a die having a segmental frusto-conical opening, a die core cooperating therewith, a punch for upsetting a segmental cylindrical blank within said opening to form a lock having a segmental cylindrical inner wall and a frusto-conical outer wall, and a knock-out mechanism for moving said die core to bring the lock out of said opening.

13. In apparatus for making valve spring retainer locks from segmental cylindrical blanks, a die having a segmental frusto-conical opening, a die core cooperating therewith, a punch for upsetting a segmental cylindrical blank within said opening to form a lock having a segmental cylindrical inner wall and a frusto-conical outer wall, a knock-out mechanism for moving said die core to bring the lock out of said opening, and means for stripping said lock from said die core.

14. A die core comprising an enlarged head, a cylindrical post extending therefrom having a reduced end forming a segmental cylindrical shoulder and a cut-away shoulder extending from said first shoulder back towards said head.

15. A knife comprising a blade having a segmental cylindrical cutting end and spring fingers curved to provide flared ends for lightly holding a collar against said cutting end.

16. A cut-off die assembly comprising a die holder having a cylindrical bore and a die mounted therein having a segmental cylindrical wall concentric with said bore to provide a segmental cylindrical space therebetween for the passage of segmental cylindrical strip material.

17. A cut-off die assembly comprising a die holder having a cylindrical bore, a die mounted therein having a segmental cylindrical wall concentric with said bore to provide a segmental cylindrical space therebetween for the passage of segmental cylindrical strip material and a cut-off knife movable across the end face of said die to sever a blank from said strip.

18. In a machine for severing and upsetting blanks from strip material, a pair of feeding and forming rolls to roll said strip material, means for severing a blank therefrom, die means for upsetting said blanks, and means operated by a common source of power for actuating said rolls and said aforesaid means.

19. In a machine for severing and upsetting blanks from strip material, a pair of feeding and forming rolls to roll said strip material, means for severing a blank therefrom, die means for upsetting said blanks, means for knocking out the upset blanks from upsetting position, and means operated by a common source of power for actuating said rolls and said aforesaid means.

20. In a machine for severing and upsetting blanks from strip material, a pair of feeding and forming rolls to roll said strip material, means for severing a blank therefrom, die means for upsetting said blanks, means for knocking out the upset blanks from upsetting position, means for stripping said upset blanks from said die means, and means operated by a common source of power for actuating said rolls and said aforesaid means.

21. In a machine for severing and upsetting blanks from strip material, a pair of feeding and forming rolls to roll said strip material; means for severing a blank therefrom; die means for upsetting said blanks; means for knocking out the upset blanks from upsetting position; means for stripping said upset blanks from said die means; a driving shaft and means operative by said shaft for actuating said rolls, severing means, upsetting die means, knock out means, and stripping means.

22. Apparatus for making valve spring retainer locks, comprising a pair of feed rolls having cooperating convex and concave peripheral surfaces, means for driving one of said feed rolls to feed flat strip material therebetween, means for urging said rolls together to bend said flat strip material in a segmental cylindrical shape, means for severing said segmental cylindrical strip material into blanks, die means for upsetting said blanks endwise to form collars having frustoconical outer surfaces and cylindrical inner surfaces, means actuating said roll driving means and said severing means and effective to stop advance of the formed strip and cause movement of the severing means to sever a blank from said strip while it rests, said severing means being provided with means to grasp a severed blank of the strip and present it to said die means after the severing operation, and means for liberating said collars from said die means.

23. Apparatus for severing and upsetting blanks from strip material, including a pair of feeding and forming rolls to feed and shape such strip material, means for severing a blank from the shaped strip material, means actuating said rolls and said severing means to cause cessation of the feed during the severing operation, die means for upsetting said blanks, and said severing means being adapted to grasp and move a blank from severing position and present it to said die means.

24. Apparatus for severing and upsetting blanks from strip material, including a pair of feeding and forming rolls to feed and shape such strip material, means for severing a blank from the shaped strip material, means actuating said rolls and said severing means and effective to cause cessation of the feed during the severing operation, die means for upsetting said blanks, said severing means being adapted to grasp and move a blank from severing position and present it to said die means, and means actuated after the die operation has been completed for knocking out an upset blank from upsetting position and for stripping said upset blank from said die.

25. In an apparatus of the class described, a main drive, means for feeding a flat strip of material and forming it into substantially segmental cylindrical shape, means for intermittently actuating said feed means from said main drive, means operated by said main drive for severing a blank from the formed strip while said feed means are at rest, said last mentioned means being adapted to grasp a severed blank, die means operable from said main drive for upsetting said blank endwise to form a collar having a frustoconical outer surface and a cylindrical inner surface, and said severing means being adapted to move a grasped blank from severing position to said die means while said feed means are at rest.

26. In a machine of the class described including a pair of cooperating grooving rollers and means for urging said rollers together to form a flat strip passing therebetween into a transversely curved strip and means for severing said strip to form blanks, the combination of die means receiving said blanks from said severing means, and a punch mechanism cooperating with said die means to form said blanks.

27. In a machine of the class described including a pair of cooperating grooving rollers and means for urging said rollers together to form a flat strip passing therebetween into a transversely curved strip and means for severing said strip to form blanks characterized by the provision of die and punch means receiving said blanks from said severing means to thereby shape said blanks in finished form, the combination of die means receiving said blanks from said severing means, and a punch mechanism cooperating with said die means to form said blanks.

OTTO R. SCHOENROCK.